US012754682B2

(12) United States Patent
Joshi et al.

(10) Patent No.: US 12,754,682 B2
(45) Date of Patent: *Oct. 6, 2026

(54) SYSTEMS AND METHODS FOR ADAPTIVE DATA PARTITIONING WITHIN CLUSTER SYSTEMS

(71) Applicant: Capital One Services, LLC, McLean, VA (US)

(72) Inventors: Rohit Joshi, Glen Allen, VA (US); Ashish Gupta, Richmond, VA (US); Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/899,049

(22) Filed: Sep. 27, 2024

(65) Prior Publication Data

US 2025/0021249 A1 Jan. 16, 2025

Related U.S. Application Data

(63) Continuation of application No. 17/880,259, filed on Aug. 3, 2022, now Pat. No. 12,131,038.

(51) Int. Cl.
*G06F 3/06* (2006.01)

(52) U.S. Cl.
CPC .......... *G06F 3/0631* (2013.01); *G06F 3/0619* (2013.01); *G06F 3/0623* (2013.01); *G06F 3/067* (2013.01)

(58) Field of Classification Search
CPC .... G06F 3/0631; G06F 3/0619; G06F 3/0623; G06F 3/067
See application file for complete search history.

(56) References Cited

U.S. PATENT DOCUMENTS

| | | | |
|---|---|---|---|
| 7,644,300 B1 | 1/2010 | Rao |
| 9,800,087 B2 | 10/2017 | Kouroussis et al. |
| 10,331,747 B1 | 6/2019 | Mohen et al. |
| 10,924,275 B1 | 2/2021 | Kumar et al. |
| 11,221,952 B1 | 1/2022 | Ganesan et al. |
| 11,481,134 B1 | 10/2022 | Agarwal et al. |
| 11,726,684 B1 | 8/2023 | Sangle et al. |

(Continued)

OTHER PUBLICATIONS

Notification of Transmittal of the International Search Report and the Written Opinion of the International Searching Authority issued in PCT/US2023/029067, mailed Dec. 20, 2023, 11 pages.

*Primary Examiner* — Nanci N Wong
(74) *Attorney, Agent, or Firm* — HUNTON ANDREWS KURTH LLP

(57) ABSTRACT

Disclosed are systems and methods for adaptive partitioning of memory and storage resources of a first cluster node of a cluster system, comprising a plurality of nodes; wherein the first node includes one or more shards; and a client device in data communication with the plurality of nodes, wherein the first node is configured to: receive a client request, identify one of the one or more shards based on the client request, retrieve shard rules of the identified shard, determine an allocation of one or more memory slots of the identified shard based on the client request, lock the one or more memory slots, and perform one or more operations on the one or more memory slots associated with the client request based on the allocation.

20 Claims, 12 Drawing Sheets

(56) References Cited

U.S. PATENT DOCUMENTS

| | | | |
|---|---|---|---|
| 11,762,881 | B2 | 9/2023 | Xie |
| 2002/0114341 | A1 | 8/2002 | Sutherland et al. |
| 2005/0132154 | A1 | 6/2005 | Rao et al. |
| 2013/0311705 | A1 | 11/2013 | Cheng et al. |
| 2014/0201492 | A1 | 7/2014 | Luan et al. |
| 2016/0217167 | A1 | 7/2016 | Zhang et al. |
| 2017/0308470 | A1 | 10/2017 | Bagal et al. |
| 2019/0340168 | A1 | 11/2019 | Raman et al. |
| 2019/0394266 | A1 | 12/2019 | Fukuyamu et al. |
| 2020/0014688 | A1 | 1/2020 | Kohli et al. |
| 2020/0409583 | A1 | 12/2020 | Kusters et al. |
| 2021/0019965 | A1 | 1/2021 | Kagaya et al. |
| 2021/0149731 | A1 | 5/2021 | Shorb |
| 2021/0406236 | A1 | 12/2021 | Killamsetti et al. |
| 2022/0334859 | A1* | 10/2022 | Xu ...................... G06F 9/45558 |
| 2023/0297439 | A1 | 9/2023 | Marom et al. |

* cited by examiner

```
"db_name_extractor_from_key": {    ← 501
    "enabled": true,
    "override_nonempty": false,
    "regex_mappings": [
            {
                "extract_name_regex": "*.pan$",
                "db_name": "pan_table"    ← 503
            },
            {
                "extract_name_regex": "*.ssn$",
                "db_name": "ssn_table"    ← 505
            }
        ]
},
```

FIG. 5A

```
fn gen_consistent_slot (hash:  u64,  slot_count:
usize)    >  u64  {
        let mut h = hash;                                   523
        let (mut b, mut j)  =  (-1i64,  0i64);
        while j  <  slot_count  as  i64  {
            b  =  j;
            h  =
    h.wrapping_mul (2_862_933_555_777_941_757).wrappi       525
    ng_add(1);
              j = ( (b.wrapping__add(1) as f64)   *   ( ( ( 1u64
    <<  31)  as f64)   /   ( ( (h  >>  33)  +  1)  as f64) ) )
                        as i64;
              }
```

FIG. 5C

SYSTEMS AND METHODS FOR ADAPTIVE DATA PARTITIONING WITHIN CLUSTER SYSTEMS

FIELD OF THE DISCLOSURE

The present disclosure is generally related to systems and methods for adaptive partitioning of memory and storage resources in a cluster node to increase performance.

BACKGROUND

Conventional server side cluster solutions suffer from high latency and performance degradation, in particular, when such caching servers are simultaneously accessed by multiple clients. Large portions of the processing power within the cache can be locked when accessed by a client, reducing responsiveness to other requests. Conventional approaches often require clients to wait in a queue when attempting to access concurrently used resources, which can cause unacceptable delay.

These and other drawbacks exist in the conventional art. Accordingly, there is a need to effectively and efficiently partition memory adaptively.

SUMMARY OF THE DISCLOSURE

Embodiments of the present disclosure provide a system, method, and a non-transitory computer-accessible medium having stored thereon computer-executable instructions for an adaptive partitioning of the memory and storage resources of a cluster node to increase performance.

Exemplary embodiments provide a node management system, method, and computer arrangement, comprising a node management system, comprising: a cluster system comprising a plurality of nodes, wherein: the plurality of nodes includes a first node, and the first node includes a memory comprising one or more shards; and a client device in data communication with the plurality of nodes, wherein the first node is configured to: receive a client request, identify one of the one or more shards based on the client request, retrieve shard rules of the identified shard, determine an allocation of one or more memory slots of the identified shard based on the client request, lock the one or more memory slots, perform one or more operations on the one or more memory slots associated with the client request based on the allocation, an unlock one or more memory slots.

The first node is further configured to: determine an allocation of one or more storage slots of the identified shard, lock the one or more storage slots, perform one or more operations on the one or more storage slots based on the allocation, and unlock one or more storage slots. The first node is further configured to perform a hash function on a key in the client request and a modulo operation to determine the allocation of the one or more memory slots. Further, the modulo operation is based on an available number of memory slots in the shard.

The first node is further configured to: identify the one of the one or more shards based on one of a prefix or suffix of the key in the client request or a container name of a client certificate associated with the client request. The shard rules can comprise one of a cache capacity and a total number of memory slots. The one or more operations can comprise one of a read, write, update, push, or pull request. Each of the one or more memory slots can be associated with a key value pair. Further, each of the one or more storage slots can be associated with a column family.

In addition, exemplary embodiments can further include the steps of: determining an allocation of one or more storage slots of the identified shard; and performing one or more operations on the one or more storage slots based on the allocation, wherein the one or more memory slots are locked when the one or more operations are performed. In addition, the a memory slot associated with the one or more storage slot can be updated based on the shard rules. The one or more memory slots represent a portion of an in-memory least-recently used (LRU) component of the node, and the one or more storage slots represent one or more column families of a persistent storage component of the node. Further, data stored in the in memory LRU component of the node, and the persistent storage component of the node, can be periodically backed up into a backup persistent storage. The backup persistent storage can be one of a remote storage or other disk based storage.

Further, exemplary embodiments can further include the steps of: storing an index of one or keys processed by the node; retrieving a backup of data stored in the shard based on the index, encrypting a value associated with the memory slot associated with the client request; and storing the encrypted value in the memory slot.

One of the nodes in the cluster system can further be configured to: receive a client request from a client device, update one of a memory slot or storage slot of the one of the plurality of nodes based on the client request, asynchronously update another one of the plurality of nodes when the another one of the plurality of nodes is an in-region node, asynchronously update a different another one of the plurality of nodes based on a key in the client request when the another one of the plurality of nodes is a cross-region node, and asynchronously update the another one of the plurality of nodes when the another one of the plurality of nodes is an in-region node on a periodic basis; wherein any update occurring to the one of the nodes occurring during a period of time associated with the periodic basis is performed as a batch update.

BRIEF DESCRIPTION OF THE DRAWINGS

Various embodiments of the present disclosure, together with further objects and advantages, can best be understood by reference to the following description taken in conjunction with the accompanying drawings.

FIG. 5A illustrates an exemplary set of programmatic instructions for specifying a shard.

FIG. 5C illustrates an exemplary set of programmatic instructions for allocating memory slots based on a number of presently available memory slots in a shard.

DETAILED DESCRIPTION

Figure 1:
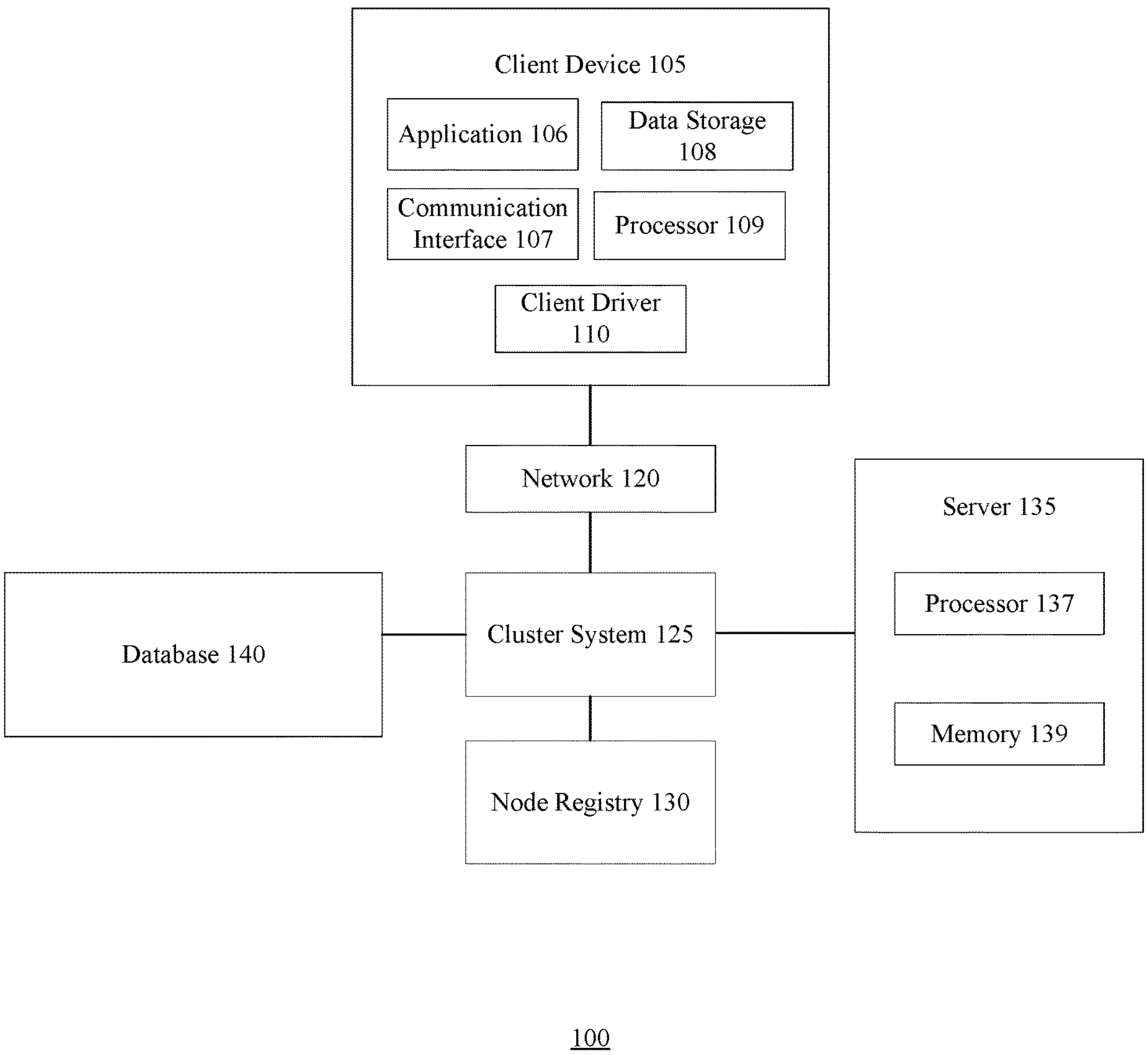
FIG. 1 illustrates an exemplary cluster node-leader management system.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides a computer implemented cluster system and method for an adaptive partitioning of the memory and storage resources of a cluster node to increase performance and facilitates the efficient management, discovery, and synchronization of a cluster system.

Benefits of the present disclosure include providing systems and methods where each node of a database can be divided into a plurality of shards, each shard can include both cache and hard-disk components. The shard can further be partitioned into discrete memory slots (associated with the cache), and storage slots (associated with the hard-disk). When a client request is received, a particular shard is identified based on the client certificate, or a prefix or suffix in a key. The memory slots and storage slots in the shard can be derived, using an algorithm that takes the hash function of the key and a modulo (or wrap function) considering the available memory and storage slots within the shard. In this manner, the cluster can increase processing speed and lower latency as processing of requests can be confined to limited discrete memory slots and storage slots associated with each request.

In addition, the algorithm for adaptive partitioning can be applied to all shards within the cluster system to increase the efficiency of allocating the resources of the cluster system. This can also further increase the adaptability and the functionality of the cluster system.

Accordingly, exemplary systems and methods described herein can enable large volumes of concurrent client requests from multiple clients. By handling this large volume of requests, multiple clients can be served effectively and efficiently while avoiding the need to expend resources on providing additional hardware.

Exemplary systems and methods can also promote system resiliency by adaptively partitioning memory as described herein. Such characteristics can be achieved because all of the data in the cluster system is stored at any given moment within each node (at least within the persistent storage component of each node) and because the memory slots and storage slots within each node are consistently backed up, each of the nodes in the cluster system to efficiently serve as a backup in the event of another node failing, or of a shard within a node failing. This significantly reduces the miss ratio i.e. any new requests can be served by the node immediately once it is online and part of the cluster system. In contrast, in conventional systems, new nodes added to the system to account for node failure are initially empty and will only be populated organically as new writes happen to the node. Moreover, each shard within a node can support different types of memory management algorithms to be performed (e.g. LRU or LFU), thus by customizing the type of memory management algorithm chosen for the nodes of the cluster system, exemplary embodiments can provide increased efficiency compared to conventional systems. In other embodiments, different types of memory management algorithms can be used for shards in order to enhance adaptability, and customization of the cluster system. In such embodiments, machine learning, and an order map, can be utilized to determine the type of memory management algorithm used for a particular shard or group of shards.

Exemplary embodiments provide that each node in the cluster system include both an in memory least recently used (LRU) cache component and a persistent storage component. Other cache type memories are within the disclosure of this invention, however, such as a least frequently used (LFU) cache component. Exemplary embodiments can support, for example, Redis Serialization Protocol (RSP) and Hypertext Transfer Protocol Secure (HTTPS), and can support, for example, the following network interfaces standards: TCP, SSL/TLS (TLS1.2/TLS1.3), and Unix Socket Domain.

FIG. 1 illustrates an exemplary cluster node-leader management system 100. The system 100 can comprise a client device 105, network 120, a cluster system 125, a node registry 130, a server 135, and a database 140. FIG. 1 may reference the same or similar components, and data as the other figures set forth herein.

The client device 105 can include a network-enabled computer system and/or device. As referred to herein, a network-enabled computer system and/or device can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a smart card, or other device. The network-enabled computer systems can execute one or more software applications to, for example, receive data as input from an entity accessing the network-enabled computer system, process received data, transmit data over a network, and receive data over a network.

The client device 105 can include at least one processor 109, which can be a central processing unit (CPU), which can be configured to execute computer program instructions to perform various processes and methods. The at least one CPU can comprise several processors (e.g., microprocessors), a single processor, or a single device having multiple processors.

The client device 105 can include a data storage 108, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email account application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 108 can be a read-only memory, write-once read-multiple memory or read/write memory, e.g., RAM, ROM, and EEPROM, and the client device 105 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it cannot be rewritten, but it can be read many times. A read/write memory can be programmed and re-programed many times after leaving the factory. It can also be read many times.

Although depicted as single elements, it should be appreciated that according to one or more embodiments, the client device 105 can comprise a plurality of client devices 105. As shown in FIG. 1, the client device 105 can include various components. As used herein, the term "component" can be understood to refer to computer executable software, firmware, hardware, and/or various combinations thereof. It is noted that where a component is a software and/or firmware component, the component is configured to affect the hardware elements of an associated system. It is further noted that the components shown and described herein are intended as examples. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The client device 105 can be any device capable of communicating via, for example, Bluetooth technology, NFC technology, WiFi Direct technology, and/or the like. The client device 105 can be associated with a user and can be configured to execute various functions to transmit and receive user data (e.g., security questions, answers to security questions, card number, account type, account balance, account limits, budget data, recent transactions, and/or the like). For example, the client device 105 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass® or Samsung Galaxy® Gear Smartwatch, devices running Microsoft's Windows® Mobile operating system, and/or any other smartphone, smartwatch, tablet, or like device, which can include personal assistant devices incorporating systems, such as Alexa, Siri, Google Assistant, and Microsoft Cortana, including home assistant devices such as Amazon Echo, Google Home, and the like.

The client device 105 can include components to send and/or receive data for use in other components, such as a communication interface 107. The communication interface 107 can include various hardware and software components, such as, for example, a repeater, a microwave antenna, or another network access device capable of providing connectivity between network mediums. The communication interface 107 can also contain various software and/or hardware components to enable communication over the network 120. For example, the communication interface 107 can be capable of sending or receiving signals via the network 120. Moreover, the communication interface 107 can provide connectivity to one or more wired networks and can be capable of receiving signals on a first medium (such as a wired network) and transmitting the received signals on a second medium (such as a wireless network). One or more users can access the network 120 through one or more client devices 105 (using the various components of the one or more client devices 105) that can be communicatively coupled to the network 120.

Client device 105 can include a client driver 110. Client driver 110 can provide runtime support for application 106, and can facilitate application 106 transmitting and receiving data from cluster system 125. For example, if an application requests data from cluster system 125, the client driver 110 can specify the address for the application to transmit client requests to the cluster system 125. Client driver 110 can provide a programming interface to control and manage lower level interfaces linked to the hardware of the client device 105.

In exemplary embodiments, client driver 110 can maintain management data. Management data can, for example, indicate a cluster topology, i.e. which cluster node the client driver should transmit requests to based on the key within the client request. A further description of management data is provided in U.S. patent application Ser. No. 17/585,407 and U.S. Patent Ser. No. 17/585,387, which both are incorporated herein by reference.

Client driver 110 can periodically transmit a data request to one or more nodes in a cluster system 125. The client driver 110 can periodically transmit data requests to the leader node and to the other nodes in the cluster system 125. In response to the data requests sent by the client driver, the leader node, (and any other nodes who were sent data requests) can transmit a reply. Client driver 110 can maintain management data indicating the identity of each of the nodes in the cluster system (such as a name, and address of each of the nodes), a current status of each of the nodes (such as a responsive, and non-responsive status), a leader status of each of the nodes, a count pertaining to the number of times a nodes has not replied to data requests from the client driver, a response time of each of the plurality of nodes, indicating a time taken for each of nodes to reply to a data request from the client driver, and other information, such as other metrics pertaining to the performance of each of the plurality of nodes. Client driver 110 can ascertain the management data from the replies received (or not received) from the nodes in the cluster system 125. If the client driver 110 determines the leader node is non-responsive (after one or more data request transmission sent thereto), the client driver 110 can reroute client requests to another node in the cluster system 125.

The client driver 110 can also utilize information in the cluster management data (such as response time) to determine which node to route client requests to in the event that the leader node is non-responsive.

The client device 105 can also include various software components to facilitate the functionalities described herein, including an application processor (not shown in FIG. 1). For example, the client device 105 can include an operating system such as, for example, the iOS® operating system from Apple®, the Google® Android® operating system, and the Windows Mobile® operating system from Microsoft®. The client device 105 can also include, without limitation, software application(s) such as web browsing applications, email account applications, and mobile banking applications, an NFC application programming interface, and software to enable touch sensitive displays.

The system 100 can include one or more network 120. In some examples, network 120 can be one or more of a wireless network, a wired network or any combination of wireless network and wired network, and can be configured to connect to any component ( ) of system 100 to any other component(s) of system 100. In some examples, network 120 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 can include, without limitation, telephone lines, fiber optics, IEEE Ethernet 902.3, a wide area network, a wireless personal area network, a LAN, or a global network such as the Internet. In addition, network 120 can support an Internet network, a wireless communication network, a cellular network, or the like, or any combination thereof. Network 120 can further include one network, or any number of the exemplary types of networks mentioned above, operating as a stand-alone network or in cooperation with each other. Network 120 can utilize one or more protocols of one or more network elements to which they are communicatively coupled. Network 120 can translate to or from other protocols to one or more protocols of network devices. Although network 120 is depicted as a single network, it should be appreciated that according to one or more examples, network 120 can comprise a plurality of interconnected networks, such as, for example, the Internet, a service provider's network, a cable television network, corporate networks, such as credit card association networks, and home networks.

Figure 2:
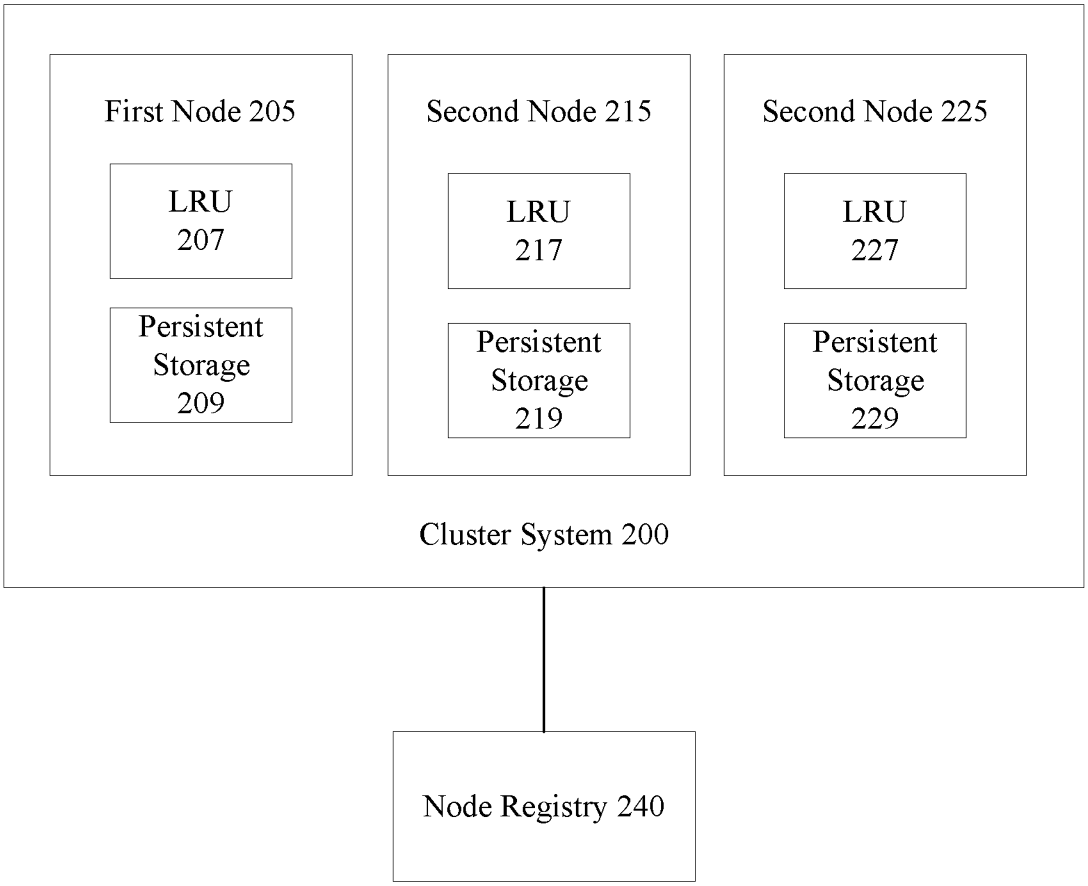
FIG. 2 illustrates an exemplary cluster system.

System 100 can further comprise one or more node registries 130, which is described in more detail with respect to FIG. 2. Node registry 130 can be provided in the form of a database or server, such as a database analogous to the database 140 described herein, or a server analogous to the server 135 described herein. Node registry 130 can function as a discovery server which can provide information about one or more nodes in the cluster system 125 to the other nodes in the cluster system 125. In exemplary embodiments node registry can provide information as to when each of the nodes in the cluster system 125 initialized or registered. Each of the nodes in the cluster system 125 can register with the node registry 130 whenever the node initializes.

System 100 can optionally comprise one or more servers 135. In some examples, the server 135 can include one or more processors 137 coupled to memory 139. The server 135 can be configured as a central system, server or platform to control and call various data at different times to execute a plurality of workflow actions. The server 135 can be configured to connect to the cluster system 125. One or more nodes in the cluster system 125 can retrieve or store data to, write to, or otherwise access data from the server 135. The server 135 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 135, it is understood that other embodiments can use multiple servers or multiple computer systems as necessary or desired to support the users and can also use back-up or redundant servers to prevent network downtime in the event of a failure of a particular server.

While FIG. 1 illustrates a server 135, it is understood that other embodiments can use multiple servers or multiple computer systems as necessary or desired to support the users and can also use back-up or redundant servers to prevent network downtime in the event of a failure of a particular server.

The server 135 can include a processor 137. The processor 137 can be, for example, one or more microprocessors. The processor 137 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 135 can include an application comprising instructions for execution thereon (not shown). For example, the application can reside in memory 139 of server 135 and can comprise instructions for execution on the server 135.

System 100 can also optionally include one or more databases 140. The database 140 can comprise a relational database, a non-relational database, or other database implementations, and any combination thereof, including a plurality of relational databases and non-relational databases. In some examples, the database 140 can comprise a desktop database, a mobile database, or an in-memory database. The database 140 can be in data communication with one or more nodes in the cluster system 125. For example, one or more nodes of the cluster system 125 can be configured to retrieve or store data from, write data to, or otherwise access data from the database 140 via one or more nodes of the cluster system 125.

In some examples, exemplary procedures in accordance with the present disclosure described herein can be performed by a processing arrangement and/or a computing arrangement (e.g., computer hardware arrangement). Such processing and/or computing arrangement can be, for example entirely or a part of, or include, but not limited to, a computer/processor that can include, for example one or more microprocessors, and use instructions stored on a computer-accessible medium (e.g., RAM, ROM, hard drive, or other storage device).

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Reference is now made to FIG. 2 which illustrates an exemplary cluster system 200. FIG. 2 may reference the same or similar components, and data as the other figures set forth herein. Cluster system 200 can be the same as cluster system 125 illustrated in FIG. 1. Cluster system 200 can include a plurality of nodes, such as first node 205, second node 210, and third node 215. First node 205, second node 210, and third node 215 and any additional nodes in cluster system 200 can be communicatively coupled to another in the cluster system 200 by, for example, a cluster bus, a shared network or other configuration connecting the components in the cluster to one another. Nodes can be configured to perform shared tasks requested by a client device (such as client device 105 described in connection with FIG. 1). Each node in the cluster system (such as first node 205, second node 210, and third node 215) can be machines, such as virtual machines or in alternative embodiments, one or more nodes can be distinct physical machines.

Each node can include an in-memory LRU component and a persistent storage component. For example, first node 205 can include in-memory LRU component 207 and a persistent storage component 209, second node 215 can include in-memory LRU component 217 and a persistent storage component 219, third node 225 can include in-memory LRU component 227 and a persistent storage component 229.

The persistent storage component can be in the form of non-volatile memory, such as, but not limited to, a non-volatile express memory (NVMe) disk. In exemplary embodiments persistent storage can utilize, for example, RocksDB.

The in-memory LRU component can be provided in any other form of volatile memory, including random access memory (RAM), and Dynamic RAM (DRAM). volatile memory.

Each node can further include an application comprising instructions for execution thereon (not shown). For example, the application can reside in one of the LRU components or persistent storage component in the nodes and can comprise instructions for execution on the node. Each node can also include a communication interface (not shown), which contains various software and/or hardware components to enable communication to other nodes and to other components (such as client devices, databases, servers, and node registries) over external networks.

The node registry 240 can be a discovery server, which stores node data pertaining to the cluster system 200. Node registry 240 can be a database or a server (such as a virtual machine provided externally to the cluster system over a network. For example, each node in the cluster system can be communicatively coupled through an internal network, such as through a cluster bus or LAN network, while node registry 240 can be communicatively coupled to the cluster system 200 through an external network, such as a WAN network. Node registry 240 can store the following node data for each node in the cluster system that registers with it: IP address, registration time, ID (or an indication of the name of a particular node), and node status. The node status can indicate if a node is in a startup state (such as when a node is initializing from an offline state), shutting down state (such as when a node is transition from an online state to an offline state), an offline state, an online state, or a non-responsive state. In addition the node registry 240 can be configured to transmit a health check transmission to each node in the cluster system 200 to determine a current node status of each of the nodes in the cluster system. Based on a reply received (or not received) from the health check transmission, the node registry can appropriately update a status of one or more nodes in the node data indicating the state of the node.

When a node in the cluster system initially starts up or initializes (and is able to communicate with node registry 240 via its communication interface) the node can be configured to transmit a registration transmission with the node registry 240.

Each of the nodes can be configured to register with the node registry 240 upon manually being turned, or via automatic processes. For example, one or nodes in the cluster system can be configured to automatically startup or initialize in response to another node in the cluster system being determined to be non-responsive or offline. To register with the node registry, a node of the cluster system can transmit one or more messages including data indicative of the node's identity (node ID), node IP address, node status, and registration time.

Figure 3:
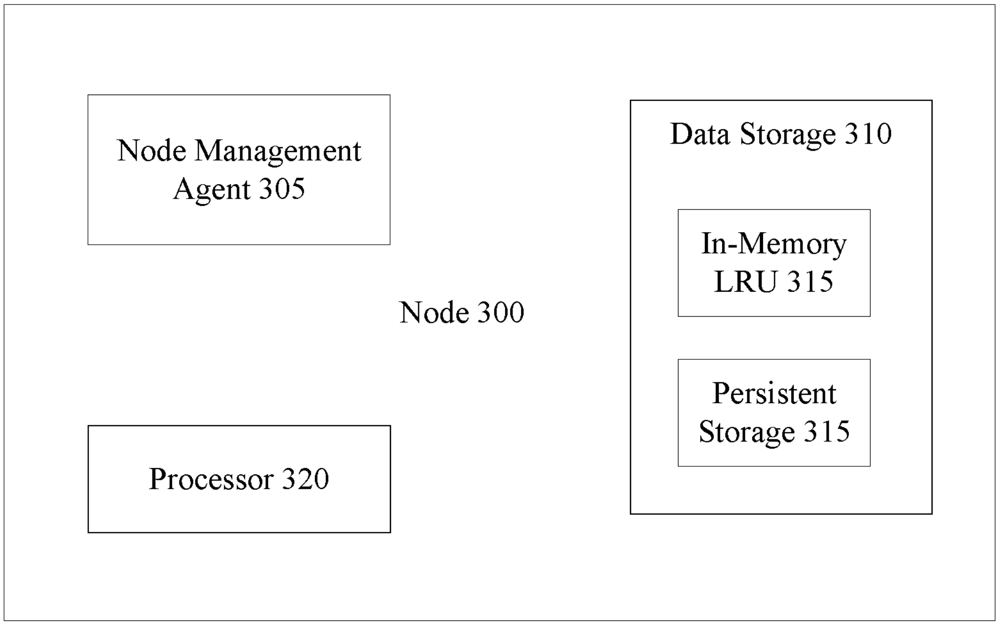
FIG. 3 illustrates an exemplary node.

Reference is now made to FIG. 3 which illustrates an exemplary node 300. FIG. 3 may reference the same or similar components, and data as the other figures set forth herein. Node 300 can have the same components as first node 205, second node 210, and third node 215 depicted in FIG. 2. Node 300 can include node management agent 305, data storage 310, and processor 320. Data storage 310 can include an in-memory least recently used (LRU) component 315 or main memory, and persistent storage 318. Persistent storage 318 can be the same as the persistent storage component described in connection to FIG. 2. Data can be stored in in-memory LRU component 315 in volatile memory so the node 300 can quickly access data, while data can be stored in persistent storage 318 as non-volatile memory, such as a non-volatile express memory (NVMe) disk. In in-memory LRU component 315 can be any other form of volatile memory, including random access memory (RAM), and Dynamic RAM (DRAM).

All of the data in the cluster system can be saved in a persistent storage component of each of the nodes. Thus, each node in the cluster system can access 100% of the data available in the cluster system, even if such data is not currently stored in the in-memory LRU component of a particular nodes. In exemplary embodiments, only data associated with particular node slots allocated to a particular node in the cluster system is stored in the in-memory LRU component 315 of that node.

Node slots can be used to allocate the storage of keys and data associated with the keys among the nodes in the cluster system. A fixed number of node slots can be distributed amongst the nodes in the cluster system at any one time. For example, cluster system can be similar to a Redis cluster containing 16,384 node slots. A particular node slot value (e.g. "8,450") can be derived by performing a hash and modulo function on a key. The hash function can take as an input the key (which can be a string of any size), compute and return a particular hash value (which is a value with a fixed length). The hash function can be, for example, a CRC-16 hash function. A modulo function using the total number of node slots in the cluster system, can thereafter be performed on the hash value to obtain the node slot value of a particular key.

A client driver of the client device can perform the hashing and modulo function on the key in the client request, and return the node slot value of one of the plurality of node slots in the cluster system. In this manner, the client driver can determine a particular node to route client requests to by deriving the node slot value from the key contained in the client request and by knowing the node slots allocated to each node in the cluster network and the number of node slots in the cluster. The node allocated to the particular node slot associated with the key contained in the client request can then be routed with that particular client request. By storing data associated with the node slots allocated to the node in the in-memory LRU component 315, the particular node can handle the client request more quickly than a node handling the client request that's required to access data associated with the client request through persistent storage.

For example, a key can be "Color," with a node slot value "10100," and the data associated with the key can include a string of different colors, e.g., "Blue, Green, Red, Yellow.") The associated data can be, for example, a string, list, set, hash, bit array, stream or another type of data structure. The key and the data associated with the key can be saved in the in-memory LRU component 315 of a third node in a cluster system (as well as the persistent storage component of each node in the cluster network) which is allocated to the node slot value corresponding to the key. If a client request includes the key "Color," a client driver of the client device can determine an associated node slot value (10100) of the key using a hashing and modulo function, and then route the client request to the third node to handle the request). The third node can then quickly and efficiently handle the client request as data associated with the key, "Color" as the data associated with the key is already stored in the in-memory LRU of the third node.

The client driver must know the cluster topology of the cluster system, i.e. how the node slots are allocated across each of the nodes in the cluster system, in order to route the client requests to the appropriate node. In exemplary embodiments, the client driver can receive the cluster topology data of the cluster system from the leader node using the systems and methods described herein.

By distributing the node slots across a plurality of nodes in the cluster system, the client requests can quickly and efficiently be handled, as each client request can be handled by a node storing data requested in its in-memory LRU component rather than having to retrieve such data from persistent storage.

Each node in the cluster system can further include a node management agent 305. Node management agent 305 can be an application executed by the processor 320. The node management agent 305 can be configured to perform the processes and functions described herein with respect to the node associated therewith. For example node management agent can be responsible for all or part of the following functions of the node 300: transmitting and receiving data to and from other nodes, the node registry, client devices (including associated client drivers), external networks, databases and servers, and internal data storage (including the in-memory LRU and persistent storage components), reading and writing such data into various components, processing and monitoring such data and performing other functions described herein.

The node 300 can also include at least one processor 320, which can be a central processing unit (CPU), which can be configured to execute computer program instructions to perform various processes and methods. The at least one CPU can comprise several processors, a single processor, or a single device having multiple processors. A single CPU can be shared among a plurality of nodes in the cluster system. The node 300 can also include a network interface (not shown), such as the network interface described in connection with FIG. 2.

Figure 4:
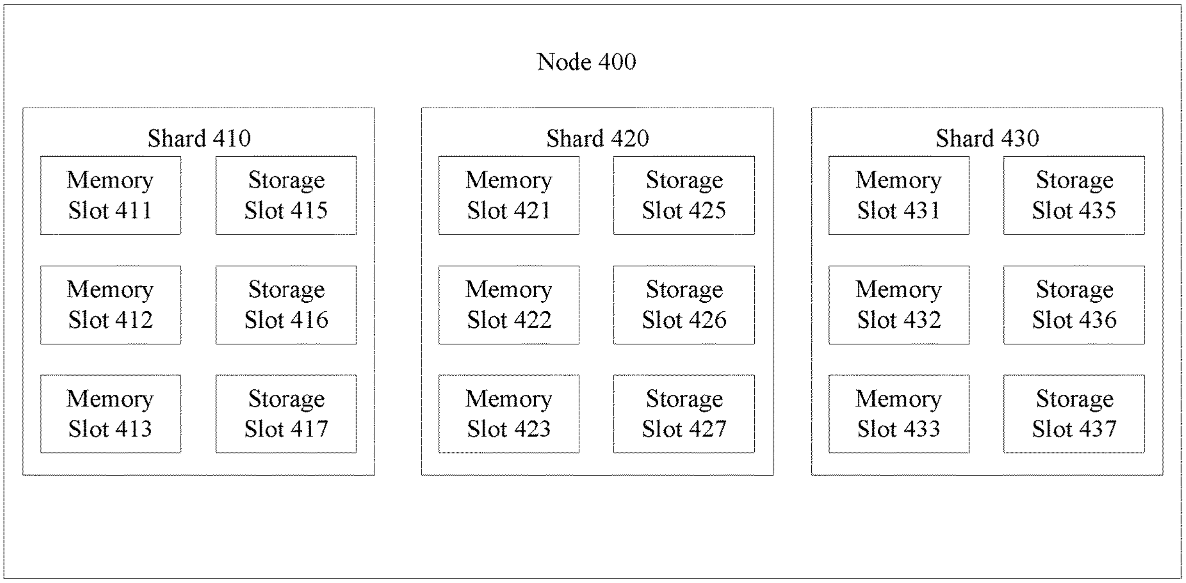
FIG. 4 illustrates an adaptive memory and storage partition logical framework utilized in exemplary embodiments.

Reference is now made to FIG. 4 which illustrates an adaptive memory and storage partition logical framework utilized in exemplary embodiments. The in-memory LRU component and persistent storage component can logically be partitioned within each node into a plurality of shards. FIG. 4 shows node 400 including three different shards 410, 420 and 430. The partitioned in-memory component within each of the shards can be logically subdivided into a plurality of memory slots, such as memory slots 411, 412, and 413 within shard 410, memory slots 421, 422, and 423 within shard 420, and memory slots 431, 432, and 433 within shard 430. Each memory slot can contain a key value pair. The partitioned persistent storage within each of the shard can be logically be subdivided into a plurality of storage slots, such as storage slots 415, 416, and 417 within shard 410, storage slots 425, 426, and 427 within shard 420, and storage slots 435, 436, and 437 within shard 430. Each storage slot can be associated with a particular column family of the persistent storage component.

Figure 5B:
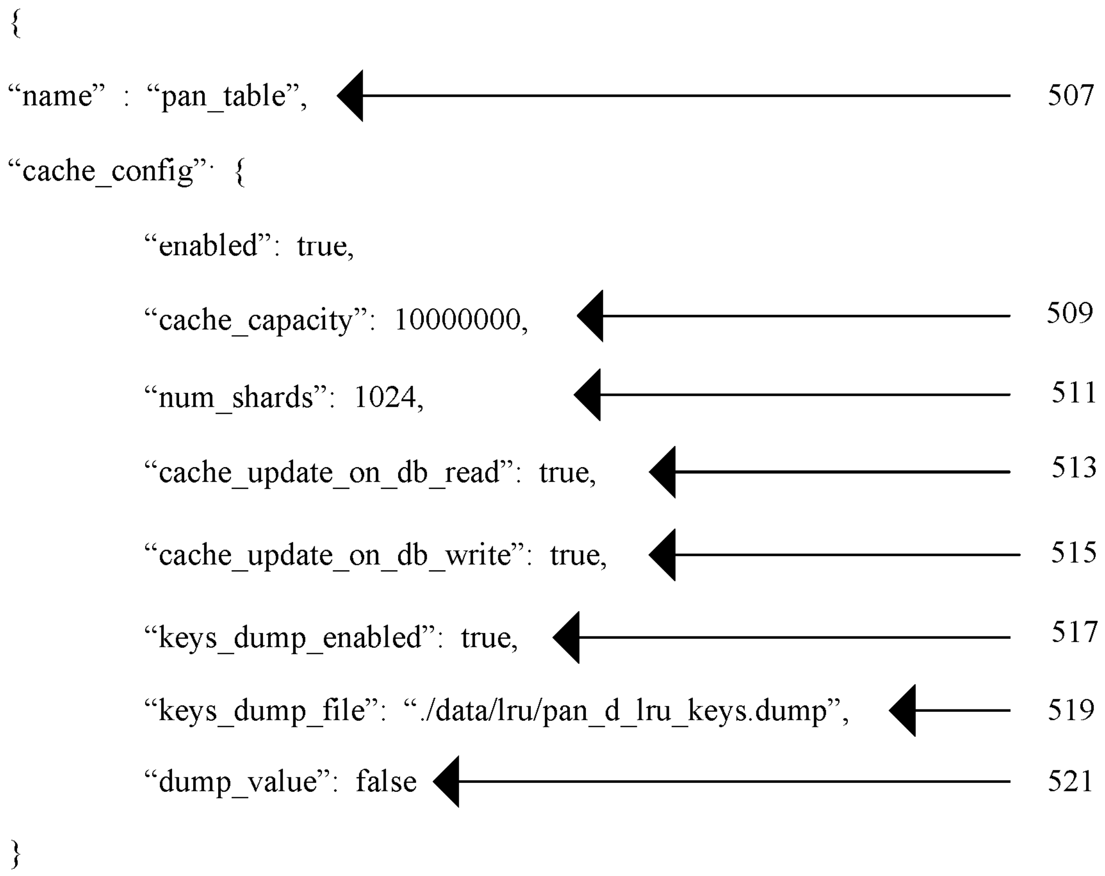
FIG. 5B illustrates an exemplary set of programmatic instructions for specifying parameters of a shard.

Reference is now made to FIGS. 5A, 5B and 5C which are an illustrative set of programmatic instructions for an adaptive memory and storage partitioning method. As described in reference to FIG. 4, each node in the cluster can include a plurality of shards, and each shard can utilize resources of the node's in-memory LRU component and persistent storage components. Each shard can be specified by a container name (CN) of a client certificate in a client request or in a prefix or suffix of the key. Each shard can contain specific rules associated with the memory slots and storage slots associated therewith, and a management agent of a cluster can apply such rules during node operations. Thus, the memory slots of a shard can represent a portion of the in-memory LRU component of the node, and the storage slots of a shard can represent one or more column families of a persistent storage component of the node.

A shard can be specified by a CN of a client certificate in a client request or in a prefix or suffix of the key, and the memory slots and storage slots can be determined from, for example, performing a hash function and modulo operation on the entire key.

The hash function used by the node management agent can be the same or a different one than used by the client driver to derive the cluster slot. For example, the hash function used by the node management agent can be one of the wyhash or xxhash hasing functions, while the client driver can use, for example, a CRC-16 hash function. In certain embodiments there can be substantially more memory slots and/or storage slots in a particular node than cluster slots in the cluster system.

FIG. 5A illustrates an exemplary set of programmatic instructions for specifying a shard. Reference 501 in FIG. 5A displays programmatic instructions for extracting a personal account number (PAN) contained in a key (received from a client request), and storing such data in a shard, with the shard name of "PAN table."

Reference 503 in FIG. 5A illustrates programmatic instructions for extracting a social security number (SSN) from a key (received from a client request), and storing such data in a shard, with the name of "SSN table." Node management agents can, for example, determine one or more shards associated with a client request.

The shard names extracted in reference 501 and 503 are merely illustrative, and a wide variety of different features can be used to classify shards from client request strings.

FIG. 5B illustrates an exemplary set of programmatic instructions for specifying parameters of a shard. In the example shown in FIG. 5B, programmatic instructions for specifying parameters of the shard's named "pan table" in reference 507 are shown. Reference 509 refers to the "cache capacity," which can specify the maximum amount of data (in bytes) available in the in-memory LRU component of the node. Reference 511 refers to the parameter named "num shards," which can specify the total number of memory slots (key-value pairs) available for the particular shard. The "cache update on db read" (reference 513) and "cache update on db write" (reference 515) are parameters which specify whether the cache component is updated when data is read from the persistent storage (cache update on db read) or when data is written in the persistent storage (cache update on db write). The parameter "keys dump" (reference 517) refers to whether memory shards are permitted to be exported or not for backup purposes, and "keys dump file" (reference 519) refers to a location in which the keys are stored in the persistent storage or other database if the parameter "keys dump" is set as true. When the key values are stored in this manner, they can be utilized by new nodes joining the system (when one of the nodes fails or otherwise stops responding), or when building a completely new cluster with the same data as applicable. The parameter "dump value" indicates whether the values in the shard should be exported along with the keys. If only the keys are dumped, then the values can be recovered by querying the persistent storage components based on the keys (in order to populate, for example, a new node). If, on the other hand, the keys and the values associated therewith are dumped, then a new node can be populated with the key/value pair more quickly, without having to query the persistent storage component. The memory slots (the key value slots) can be accessed and inserted at run time. During the course of operation in the in-memory LRU component, the least recently used memory slot can be dumped periodically, or when the cache is at capacity.

FIG. 5C illustrates an exemplary set of programmatic instructions for allocating memory slots based on a number of presently available memory slots in a shard. A hash function (named "gen_consistent_slot"-reference 523) can be performed on the key in order to derive a particular value associated with the memory slot—and a wrap function (reference 525), which is a modulo function can be used to generate consistent slot values based on the available number of memory slots. In this manner, the memory slots can be evenly divided among the available memory of the in-memory LRU component during run time.

Figure 6:
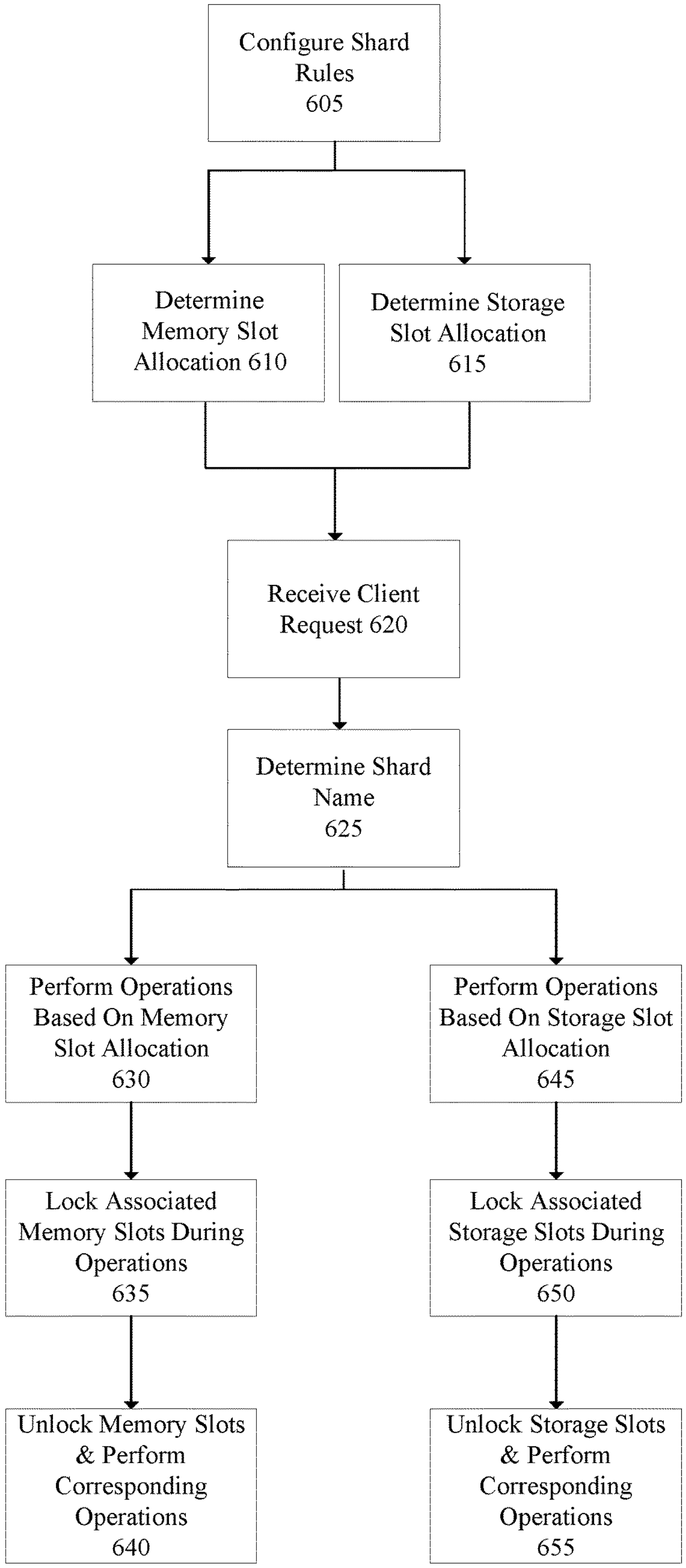
FIG. 6 is a flow diagram illustrating an exemplary process for adaptive memory and storage partitioning process in a node.

Reference is now made to FIG. 6, which is a flow diagram illustrating an exemplary process for node partitioning management processes.

At step 605 shard rules can be configured for one or more shards in a particular node. Parameters described in connection with FIG. 5B can be configured. For example, the "cache capacity parameter can specify the available memory in the in-memory LRU component, and the "num shards" parameter, relating to the total number of memory slots for the "pan table" shard can be set. In some embodiments, the shard rules can be configured before client requests are received pertaining to the resources of the shard.

At step 610 the memory slots within a particular shard can be allocated based on the shard rules for the particular shard. As discussed in connection with FIG. 5C, this step can involve a hash function that can be performed on the key and a wrap function (or modulo function) can be performed based on the number of available memory slots.

At step 615 the storage slots within a particular shard can be allocated based on the shard rules for the particular shard. Similar to the memory slot allocation process described with respect to step 610, rules associated with the shard can be used to allocate space of the persistent storage resources associated with the shard. For example, a hash function can be performed on the key and the number of available column families within the associated persistent storage disk space can be used as a modulo function to determine a database slot allocation. Each shard can have one or more column families allocated to it.

At step 620 a node in a cluster system can receive a request from a client. The client request can include a key, which can include prefix and/or suffix associated with a shard name, and a client certificate associated with a shard name.

At step 625 the shard name can be extracted from the client request string and/or the CN of the client certificate. For example, the shard name can be extracted from the prefix or suffix of the key or from the CN of the client certificate.

At step 630 one or more operations associated with the client request can be performed based on the memory slot allocation. The client request can be, for example, a read, write, update, push, or pull request. A particular client request can map to a particular memory slot (key value pair) based on the key in the client request and the operation can affect the particular memory slot. A hash function, and modulo function can be performed on the key to determine the particular memory slot allocated to it for performing the operation associated with the client request.

At step 635, when the one or more operations are performed, the memory slot associated with the key (from the client request) can be locked. Because only small partitions of memory are locked during operation, exemplary embodiments advantageously enable low latency, and high throughput for server side configurations which are accessed simultaneously by many clients.

At step 640, after the one or more operations are performed the memory slot associated with the key can unlocked and an associated one or more database column of the persistent storage can be updated based on the shard rules. For example, if the client request includes a write operation, data can be written to the memory slot first, and then to associated one or more storage slots asynchronously or synchronously, depending on the settings of the shard and/or the client request operation. During a read operation, if data is not found in a memory slot associated with a client request, data can be retrieved from an associated storage slot, and the associated memory slot can be updated thereafter to include the requested data for future use.

At step 645 one or more operations associated with the client request can be performed based on the database slot allocation. The client request can be, for example, a read, write, update, push, or pull request. A particular client request can map to one or more column families of the persistent storage.

At step 650, during the one or more operations associated with the client request (in step 645), the one or more column family(s) to which the one or more operations occur can be locked. Because only small partitions of disk storage are locked during operation, exemplary embodiments advantageously enable low latency, and high throughput for server side configurations which are accessed simultaneously by many clients.

At step 655, after the one or more persistent storage operations are performed the one or more storage slots are unlocked and an associated memory slot (of the in-memory component) can be updated based on the shard rules.

Exemplary embodiments enable pre-seeding through the source of the data. The data stored in the persistent storage and in-memory LRU components can be periodically backed up in a backup persistent storage component. For example, the data can be backed up once a day (e.g. at night). The backup persistent component can be, for example, a remote storage (e.g. a third party cloud provider), or some other disk based storage. This allows the pre-seeding of in-memory cache and persistent storage using the following mechanisms. 1. Restore the in-memory LRU component from the backup persistent storage component. In this mechanism, each memory slot (i.e. the key value within each memory slot) can be dumped to a backup location in the persistent storage periodically, and if the node (or shard) previously storing such data fails, the data can be loaded into a new node. 2. Restore the persistent storage backup from the backup persistent component. In this mechanism, the backups of one or more nodes can be restored from the backup persistent storage, and the entire backup can be loaded as is, so that each node has all of the data in the cluster system. 3. Load data from the source of the persistent storage. In this mechanism, an index can be maintained in the cluster system of the last fetched record on the node, and key associated with the fetch. In this regard, the data saved within a particular node can be reconstructed based on such an index. During this persistence storage construction process, the loaded data can be populated into the in-memory LRU component selectively.

Figure 7:
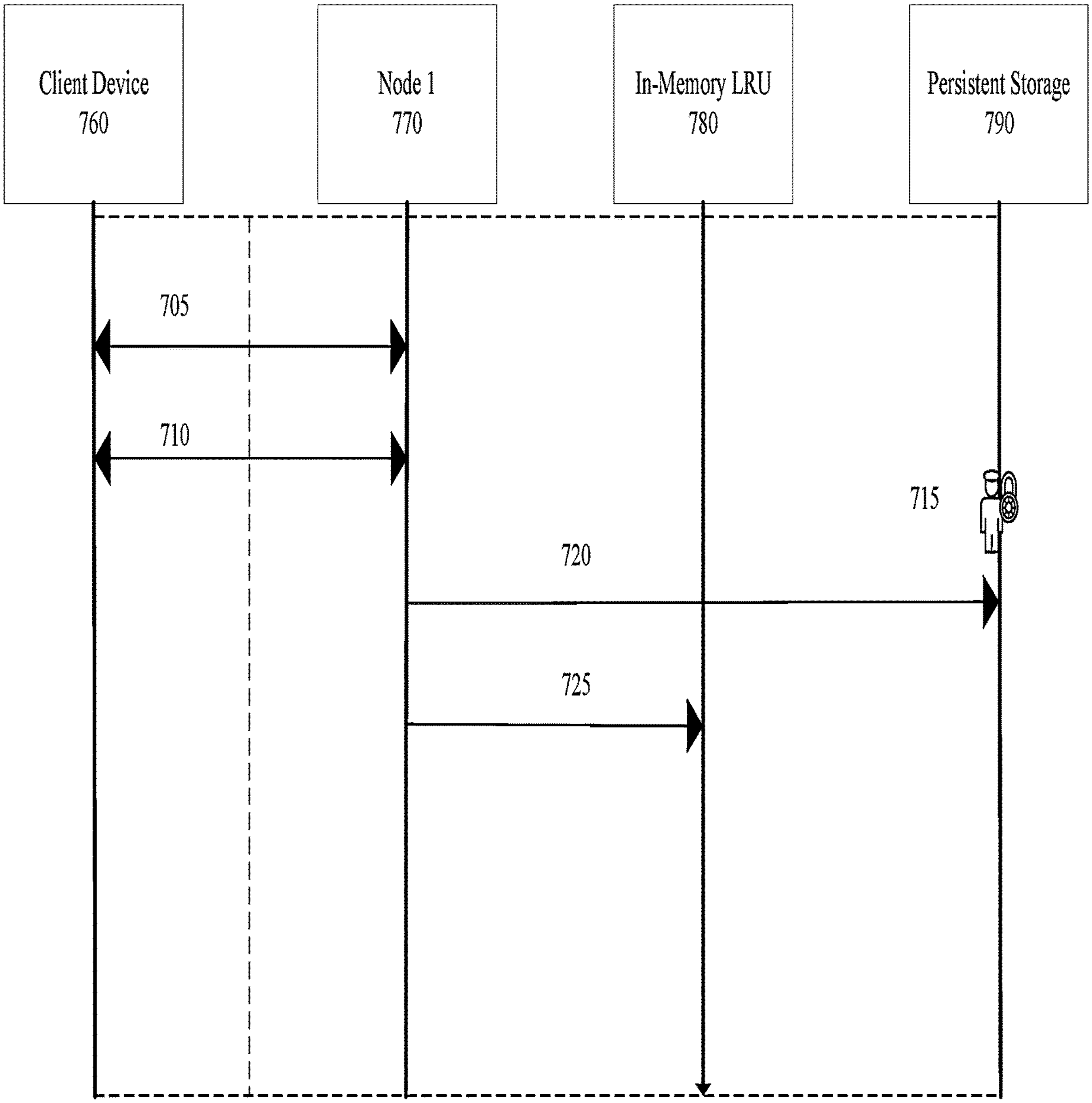
FIG. 7 is a sequence diagram which illustrates security processes utilized in exemplary embodiments.

FIG. 7 is a sequence diagram which illustrates security processes utilized in exemplary embodiments. As shown in sequence 705, exemplary embodiments can utilize Mutual Transport Layer Security (mTLS) to ensure that the client is authenticated when connecting to a node in the cluster system. For example, the client device 760 can encrypt client requests with its private key, and its public key can be accessible with one or more nodes (such as first node 770) in the cluster system via a TLS certificate. After the one or more nodes receives the client request, the message can be decrypted with the public key of the client device.

At sequence step 710 the client device and the first node can perform a TLS handshake when communicating in order to further enhance security.

At sequence step 715 when data is stored in the persistent storage 790 (in for example, an NVMe SSE disk) it can be encrypted at rest.

At sequence steps and 725 key values (i.e. key values in the memory slots and storage slots) can be encrypted prior to being stored in the in-memory LRU components (step 720) and persistent storage (step 730). The cluster management agent of the node 770, can encrypt the key values prior to the storage. Prior to transmitting and storing key values to a client device the node management agent can decrypt the key values.

Figure 8:
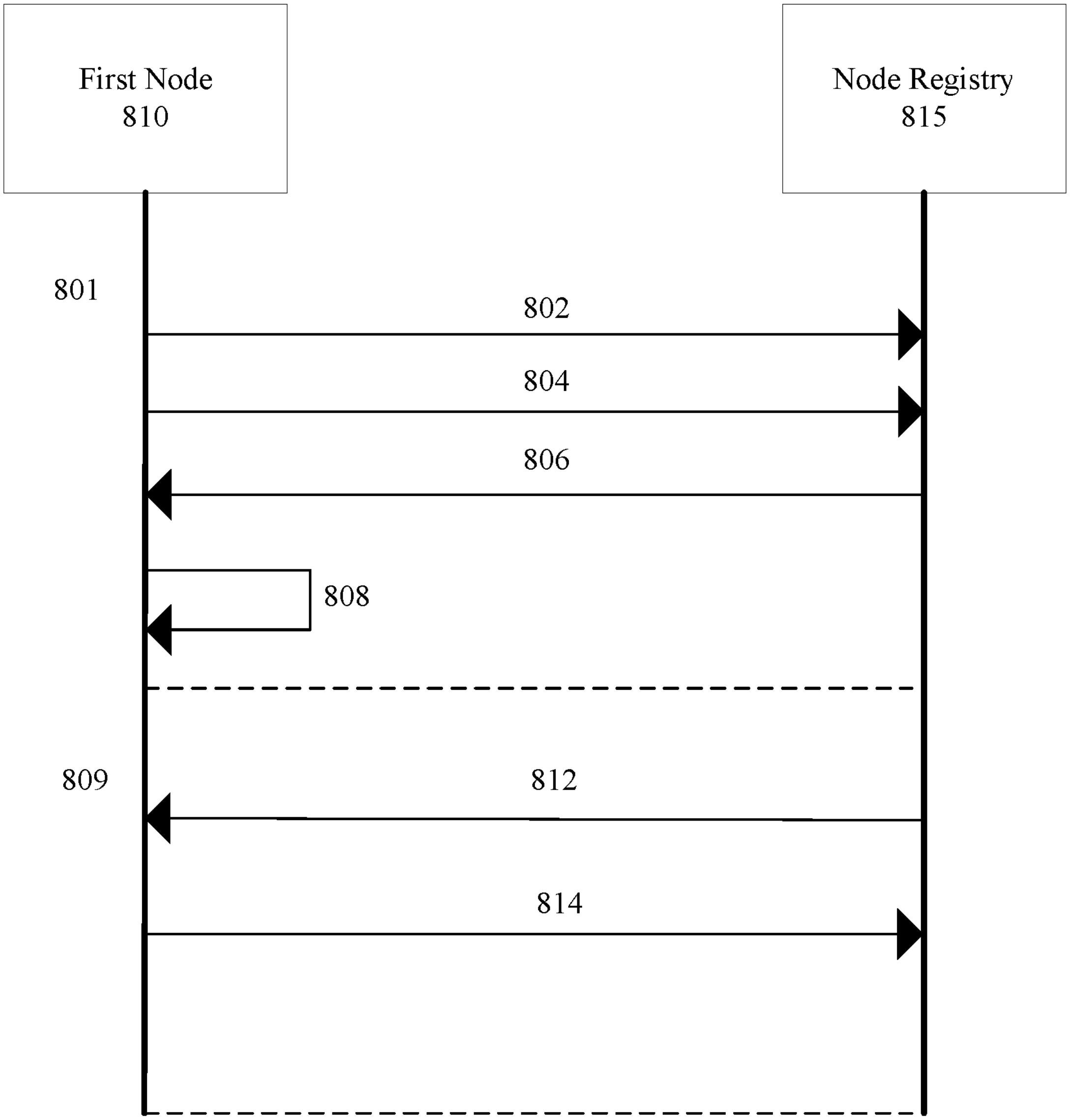
FIG. 8 is a sequence diagram illustrating an exemplary cluster leader node election process and an exemplary health check process.

Reference is now made to FIG. 8, which is a sequence diagram illustrating an exemplary cluster leader node election process and an exemplary health check process. FIG. 8 may reference the same or similar components, and data as the other figures set forth herein.

The exemplary processes illustrated in FIG. 8 can involve a cluster system including at least one node, such as first node 810, and a node registry 815 provided as an external database or server. The exemplary process can involve more than one node and/or node registry.

Reference 801 refers to an exemplary cluster leader node election process. At sequence 802 when the first node 810 initially starts up or initializes the first node can transmit a registration request to node registry 815 of the cluster system. The node registry 815 can update node data in response to receiving the node registration request. For example, node registry can add or update node data to reflect the node ID, registration time, and node status of the first node 810. Such data can be included in the node registration request, or can be communicated to the node registry 815 in subsequent transmissions to the node registry from the first node 810.

At sequence step 804 first node 810 can transmit a request to node registry 815 to receive node data.

At sequence step 806, node registry 815 can transmit node data to the first node 810. In some embodiments, the transmitted node data can be in the form of a chronological list, listing the ID, IP address, and node status, and registration time of each of the nodes based on the registration time(s) of each of the nodes.

At step 808 first node 810 can identify a leader node based on the node data. First node 810 can, for example, determine the leader node from the node data by identifying a node with an online status having the earliest registration time.

If first node 810 determines that it is the leader node, first node 810 can alter the fully qualified domain name (FQDN) associated with the cluster system to its own IP address. A client driver only knowing only a hostname (or partially qualified domain name) of the cluster system, can thus readily communicate with the leader node as its request sent to the hostname of the cluster system will be resolved to the address of the leader node via a domain name server.

Reference 809 refers to an exemplary health check process. Node registry 815 can be configured to transmit a health check transmission to each node in the cluster system to determine a current node status of each of the nodes. At sequence step 812, for example, node registry can transmit a health check transmission to a first node 810 of the cluster system. At step 814, based on a reply received (or not received) from the health check transmission, the node registry 815 can appropriately update the current node status of the first node 810 in node data. For example, if the first node 810 successfully transmits a reply to the node registry 815, the node registry 815 can designate the first node 810 as online in node data. If the first node fails 810 to respond to the health check transmission, the node registry 815 can designate the first node 810 as offline in node data. If the first node 810 continues to transmit data to the node registry 815, but fails to respond to the health check transmission, or otherwise provides a transmission to the node registry 815 indicating hardware or software issues, the node registry 815 can designate the first node 810 as non-responsive. The node registry can periodically transmit health check transmissions to each of the nodes in the cluster system, on a regular interval, such as once every 5 seconds.

Figure 9:
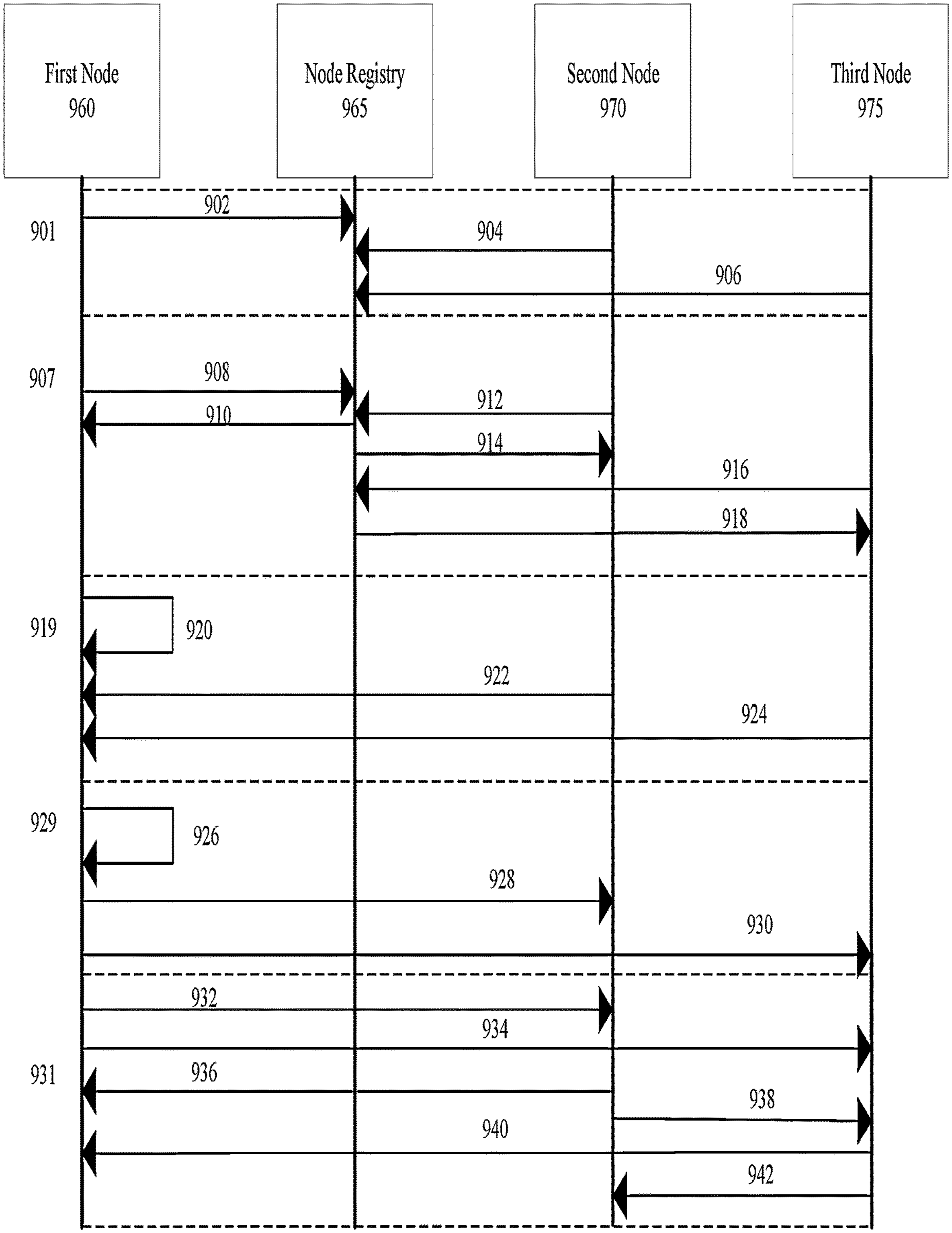
FIG. 9 is a sequence diagram illustrating exemplary clustering and node information sharing processes.

Reference is now made to FIG. 9, which is a sequence diagram illustrating exemplary clustering and node information sharing processes. FIG. 9 may reference the same or similar components, and data as the other figures set forth herein. The processes described in FIG. 9 can involve a cluster system including a first node 960, a second node 970, and a third node 975, and an external node registry 965. The processes illustrated with respect to FIG. 9 however, are applicable to systems involving more nodes and/or node registries.

Reference 901 refers to an exemplary node registration process which contains steps similar to steps to the process described with respect to FIG. 4. At sequence step 902, first node 960 can transmit a registration request to node registry 965 at a first, earliest time. At sequence step 904, second node 970 can transmit a registration request to node registry 965 at a second time which is later than the first time. At sequence step 906, third node 975 can transmit a registration request to node registry 965 at a third time which is later than the second time. The node registry 965 can receive all such registration requests and update node data in real time as the registration requests are received. The node data can, for example, indicate the ID, address, node status, and a registration time (based on when the registration request was received) of each of the first node 960, second node 970, and third node.

Reference 907 refers to an exemplary leader node determination process which contains similar steps to the process described with respect to FIG. 4. In sequence step 906 first node 960 can transmit a request to the node registry 965 to receive node data. At sequence step 908, node registry 965 can return node data to the first node 960, indicating which of the nodes already registered with the node registry 965 was first to register (which is the first node 960 in the example illustrated in FIG. 9). The first node 960 can determine that it is the leader node based on the received node data as it is the earliest registered node in the node data. Because the first node is the leader node it can alter the FQDN of the cluster system so that all client requests directed to the hostname of the cluster network are resolved to the address of the leader node.

At sequence step 910, second node 970 can transmit a request to the node registry 965 to receive node data. At sequence 912, the second node 970 can determine that the first node 960 is the leader node because the received node data indicates that the first node has the earliest registration time and is online.

At sequence step 914, the third node 975 can transmit a request to the node registry 965 to receive node data. At sequence 916, the third node 975 can determine that the first node 960 is the leader node because the received node data indicates that the first node has the earliest registration time and is online.

In the exemplary leader node determination process 907 the first, second, and third nodes can periodically transmit requests to the node registry 965 to receive current node data, receive the current node data from the node registry 965, and determine the current leader node based on the current node data. In certain embodiments, this process can occur approximately once every sixty seconds. The sequence steps 908, 912, and 916, corresponding to the first, second, and third nodes transmitting a request to the node registry 965 to receive a current node data, can occur at approximately the same time, and the node registry 965 can transmit node data to each of the nodes in the cluster system (corresponding to sequence steps 910, 914, and 918) at approximately the same time. Alternatively, the node registry 965 can be configured to transmit node data to a particular node whenever it receives requests from that node.

Reference 919 refers to an exemplary cluster initialization process. At sequence step 920 after first node 960 has determined the leader node, which in the illustrative example in FIG. 9 is the first node 960, the first node 960 designates itself as the leader of the cluster system.

In sequence step 922 after the second node 970 has determined the leader node, which in the illustrative example in FIG. 9 is the first node 960, the second node 970 joins the cluster system by providing a cluster password to the leader node (the first node 960) so that the leader node can authenticate the second node 970. An authentication confirmation can be transmitted from the leader node to the second node 970 in response.

In sequence step 924 after the third node 975 has determined the leader node, which in the illustrative example in FIG. 9 is the first node 960, the third node 975 joins the cluster by providing a cluster password to the leader node (the first node 960) so that the leader node can authenticate the third node 975. An authentication confirmation can be transmitted from the leader node to the third node 975 in response.

Reference 925 illustrates an exemplary node slot allocation process. In the exemplary node slot allocation process the leader node can determine the allocation of node slots for each of the nodes in the cluster system based on the responsiveness of the nodes. During this process, all of the node slots in the cluster node are allocated among the nodes in the cluster system. If only one node is present in the cluster system, for example, that node must contain the node slots of the cluster system. The leader node can determine to adjust the allocation of the node slots amongst the cluster nodes in the cluster system because of, for example, failure of one or more nodes in the cluster system, performance related issues of one or more nodes in the cluster system, and/or alterations in the volume or other characteristics of client requests (to the extent that such alterations render a particular node ineffective).

In sequence step 926 the leader node (which is first node 960 in the example shown in FIG. 9) can initially allocate or adjust the allocation of the node slots to the first node 960. In certain embodiments the leader node can determine to allocate no node slots to the first node 960 when it has determined that, for example, the first node 960 is the leader node. In can be beneficial in certain situations to have no node slots allocated to the leader node so that all of the processing capabilities of the leader node are directed to performing tasks in which the leader node is solely responsible for, such as, for example, allocating node slots across the nodes in the cluster system, and monitoring the performance of the other nodes in the cluster system. In other embodiments, (including embodiments where only one node is present in the cluster system) the leader node can allocate one or more node slots to itself. Such a configuration can be beneficial when the leader node has enough processing capability to perform both its function as a leader node and as a non-leader node, or there are not enough available nodes.

In sequence step 928 the leader node can initially allocate or adjust the allocation of the node slots in the second node 970. The leader node can also transmit a health check to the second node 970, and determine a node status of the second node 970 based on a reply from the second node 970. The node status can indicate if a node is in a startup state (such as when a node is initializing from an offline state), shutting down state (such as when a node is transition from an online state to an offline state), an offline state, an online state, or a non-responsive state. The leader node can determine to adjust the allocation of node slots according to the node status of the second node 970 and of the other nodes in the cluster system.

In sequence step 930 the leader node can initially allocate or adjust the allocation of the node slots in the third node 975. The leader node can also transmit a health check to the third node 975, and determine a node status of the third node 975 based on a reply from the third node 975. The leader node can determine to adjust the allocation of node slots according to the node status of the third node 975 and of the other nodes in the cluster system.

When the leader node initially allocates or adjusts the allocation of node slots of a particular node in the cluster network, the node can pull data associated with the node slots now allocated thereto into its in-memory LRU that is not already present and/or current. The data associated with the now allocated node slots can be obtained from the persistent storage of the cluster network. The first node can also perform this same process in sequence step 926 to the extent node slots are allocated to it with respect to pulling data associated with the node slots allocated thereto.

The exemplary node slot allocation process can be performed periodically, or can be performed on an ad hoc basis by the leader node. As the process of loading data into the in-memory LRU can be time consuming and computationally costly, the alteration of the allocation of node slots in the cluster is only performed when needed.

Reference 931 refers to an exemplary updating process in the cluster system. In the exemplary updating process each of the nodes in the cluster system can push any updates to the data associated with the node slots allocated to the respective node to the other nodes in the cluster system so that the other nodes can replicate the updates into their persistent storage. In this manner, each node in the cluster system can actively maintain all of the data associated with each node slot in the cluster system in its persistent storage At sequence step 932 first node 960 can push any updates to the data associated with the node slots allocated to the first node 960 to the second node 970. Second node 970 can thereafter replicate the updates to its persistent storage component. At sequence step 934 first node 960 can push any updates to the data associated with the node slots allocated to the first node 960 to the third node 975. Third node 975 can thereafter replicate the updates to its persistent storage component.

At sequence step 936 second node 970 can push any updates to the data associated with the node slots allocated to the second node 970 to the first node 960. First node 960 can thereafter replicate the updates to its persistent storage component. At sequence step 938 second node 970 can push any updates to the data associated with the node slots allocated to the second node 970 to the third node 975. Third node 975 can thereafter replicate the updates to its persistent storage component.

At sequence step 940 third node 975 can push any updates to the data associated with the node slots allocated to the third node 975 to the first node 960. First node 960 can thereafter replicate the updates to its persistent storage component. At sequence step 942 third node 975 can push any updates to the data associated with the node slots allocated to the third node 975 to the second node 970. Second node 970 can thereafter replicate the updates to its persistent storage component.

By continuously performing the exemplary updating process 931, it can be ensured that all of the cluster system data accessible by a client device is backed up in the persistent storage components of each of the nodes in the cluster system. In the event of failure of one or more of the nodes in the cluster, another of the nodes in the cluster systems can access any data associated with node slots allocated to the failed node.

In an alternative updating process whenever data is written into one of the nodes in the cluster by a client device, the data which is written can be propagated to other nodes in the cluster. In this manner, the other nodes can store the newly written data into each of their persistent memory components. Unlike the exemplary updating process, in the alternative updating process, an inter-node communication in the cluster is required.

In certain embodiments the exemplary updating process is performed on a periodic basis and is performed at a greater frequency than the leader node determination process 907 and node slot allocation process 925. In a particular embodiment, the exemplary updating process is performed approximately once every ten seconds.

In certain embodiments after one or more node slot has been reallocated away from one node (which has not been determined to be not responsive), that node can remove data associated with the node slots which have reallocated away therefrom from its in-memory LRU component. Such a feature can ensure that the in-memory of the LRU does not run out of space.

Exemplary embodiments support in-region replication. Each node in the cluster system can retrieve data from the other in-region nodes in the cluster system, and each node can maintain all of the data in the cluster system in its persistent storage. through, for example the processes described with respect to reference 931, For example, when data is updated in one of the nodes in the cluster system, that node can asynchronously write such updates to the other in-region nodes in the cluster system. A node can be considered an in-region node to another node based on a variety of metrics, including if the nodes are within a certain geographical distance from one another, or within the same geopolitical state or region. In some embodiments, the asynchronous updates can be performed on a periodic basis (such as once a day), and all updates can be transmitted in batch (in the form of a batch update) from one node to the other in-region nodes in the cluster.

Exemplary embodiments further support cross-region replication. If cross-region replication is enabled, in addition to writing into in-region nodes, a node can write to one or more remote nodes (i.e. cross-region nodes) based on the hash of the key that caused an update to the node. A node can be considered a cross-region node to another node, if the node is, for example, more than a certain physical distance away from the another node, or within a different geopolitical state or region. Various rules can be associated with the hash of the key pertaining to cross-region replication, including rules pertaining to which remote nodes can be updated.

Figure 10:
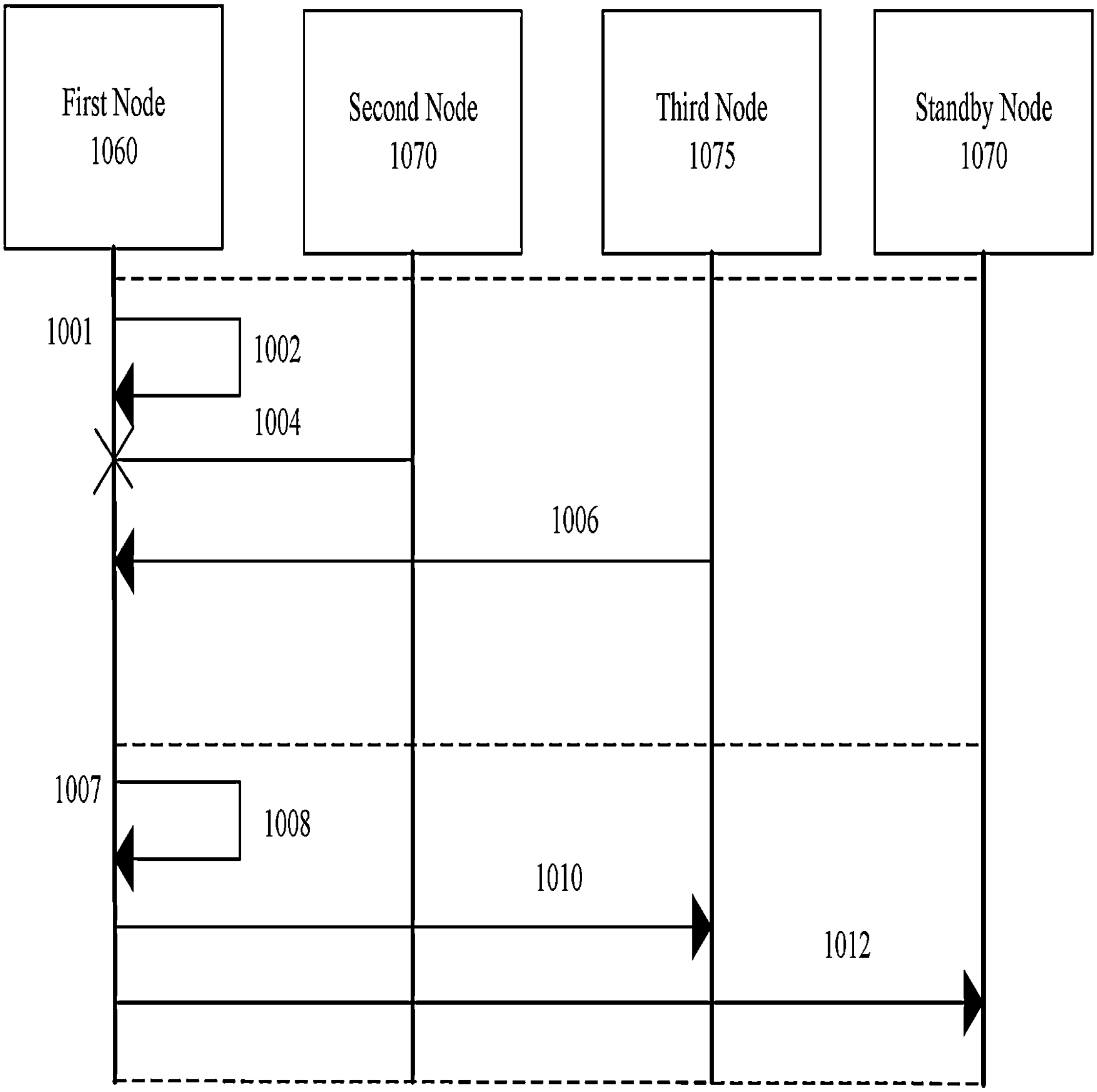
FIG. 10 is a sequence diagram illustrating exemplary non-leader node failure processes in the exemplary cluster system.

FIG. 10 is a sequence diagram illustrating exemplary non-leader node failure processes in the exemplary cluster system. FIG. 10 may reference the same or similar components, and data as the other figures set forth herein. The exemplary node failure process can involve a cluster system including a first node 1060, a second node 1070, a third node 1075, and a standby node 1080. The processes illustrated with respect to FIG. 10 however, are applicable to systems involving more nodes and/or other components.

Reference 1001 refers to an exemplary cluster initialization process during non-leader node failure. In the system associated with the exemplary cluster initialization process 1001 in FIG. 10, the first node 1060 can have previously been determined by each of the nodes in the cluster system to be the leader node, and first, second, and third nodes can have previously have had all of the data slots in the cluster system allocated amongst each other.

In sequence step 1002, the first node 1060, as the leader node. At sequence step 1004, the second node 1070 does not provide a cluster password to the leader node, the first node, because, for example, the second node has an internal error or some other failure. If the second node 1070 does not provide a cluster password to the leader node after a predetermined period of time, the leader node can determine that the second node is not responsive and no longer available in the cluster system. In sequence step 1006 the third node can provide a cluster password to the leader node so that the leader node can authenticate the third node and recognize and verify it is responsive.

In alternative embodiments, the leader node can determine that one or more of the nodes in the cluster system are not responsive when the leader node fails to receive an expected transmission from the one or more nodes after a predetermined period of time.

Reference 1007 refers to an exemplary data slot allocation process during non-leader node failure. In sequence step 1008, the leader node (the first node 1060) can reallocate data slots previously allocated to the second node 1070 to itself. Thereafter, the leader node can load data associated with the newly allocated data slots into its in-memory LRU component from its persistent storage component. In sequence step 1010, the leader node can reallocate data slots previously allocated to the second node 1070 to the third node 1075. Thereafter, the third node 1075 can load data associated with the newly allocated data slots into its in memory LRU component from persistent storage.

In sequence step 1012, the leader node can allocate data slots previously allocated to second node 1070 to standby node 1080. Standby node 1080 can be a dedicated node that initially registers with the node registry but is not initially allocated with any data slots. In some embodiments, the persistent storage component of the standby node 1080 can be consistently updated with the data associated with all of the data slots in the cluster system, just as the other nodes in the cluster system. Alternatively, upon standby node 1080 being activated it can load data from the persistent storage of one of the active nodes into its persistent storage, and/or in memory LRU component.

In the event one of the active nodes in the cluster system fails, the standby node can already be initialized by the leader node, and can load data associated with the data slots allocated to it into its in-memory LRU component. While the replacement node starts up and loads data into its in-memory LRU component, or persistent storage, other nodes in the cluster system can handle client requests by utilizing persistent storage when handling client requests pertaining to the data slots of a failed node.

After the leader node allocates data slots to the standby node, a new standby node can be automatically launched. In some embodiments, the new standby node can retrieve and store data associated with each of the data slots in the cluster system into its persistent storage even before it is activated by the leader node.

As set forth herein, exemplary embodiments of the present disclosure offers significant benefits over conventional systems. Compared to conventional systems, exemplary embodiments can mitigate the impact of node failure in multi node cluster systems, and thus decrease the read and write time, and latency time caused by increasing traffic achieved during deployment.

It is understood that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A node management method, comprising:

dividing a node into a plurality of shards, each shard comprising a plurality of volatile memory slots and persistent storage slots;

identifying one of the plurality of shards, and an allocation of at least one of that shard's plurality of volatile memory slots and the plurality of persistent storage slots based on a client request;

locking the allocated at least one volatile memory slot;

performing one or more operations, based on the client request, on the allocated at least one volatile memory slot;

unlocking the allocated at least one volatile memory slot upon completion of performing the one or more operations, wherein the one or more volatile memory slots and the one or more persistent storage slots are locked when the one or more operations are performed; and updating the allocated at least one persistent storage slot based on the one or more operations performed on the at least one volatile memory slot.

2. The node management method of claim 1, further comprising retrieving shard rules of the identified shard.

3. The node management method of claim 2, further comprising updating a volatile memory slots associated with the at least one persistent storage slot based on the shard rules.

4. The node management method of claim 1, wherein the at least one of the plurality of volatile memory slots represent a portion of an in-memory least-recently used (LRU) component of the node, and the at least one of the plurality of persistent storage slots represent one or more column families of a persistent storage component of the node.

5. The node management method of claim 4, further comprising:

periodically backing up data stored in the in memory LRU component of the node and the persistent storage component of the node into a backup persistent storage.

6. The node management method of claim 4, wherein the backup persistent storage is one of a remote storage or other disk based storage.

7. The node management method of claim 4, further comprising:

storing an index of one or more keys processed by the node; and retrieving a backup of data stored in the shard based on the index.

8. The node management method of claim 1, further comprising:

encrypting a value associated with the memory slot associated with the client request; and storing the encrypted value in the memory slot.

9. A node management system, comprising:

a cluster system comprising a plurality of nodes, wherein:

the plurality of nodes includes a first node, and the first node comprises a plurality of shards, each shard comprising a plurality of volatile memory slots and a plurality of persistent storage slots; and a client device in data communication with the plurality of nodes, wherein the first node is configured to:

identify one of the plurality of shards, and an allocation of at least one of that shard's plurality of volatile memory slots and the plurality of persistent storage slots based on a client request;

lock the allocated at least one volatile memory slot;

perform one or more operations, based on the client request, on the allocated at least one volatile memory slot;

unlock the allocated at least one volatile memory slot upon completion of performing the one or more operations, wherein the one or more volatile memory slots and the one or more persistent storage slots are locked when the one or more operations are performed; and update the allocated at least one persistent storage slot based on the one or more operations performed on the at least one volatile memory slot.

10. The node management system of claim 9, wherein the first node is further configured to retrieve shard rules of the identified shard.

11. The node management system of claim 10, further comprising updating a volatile memory slots associated with the at least one persistent storage slot based on the shard rules.

12. The node management system of claim 9, wherein the at least one of the plurality of volatile memory slots represent a portion of an in-memory least-recently used (LRU) component of the node, and the at least one of the plurality of persistent storage slots represent one or more column families of a persistent storage component of the node.

13. The node management system of claim 12, wherein the first node is further configured to:

periodically back up data stored in the in memory LRU component of the node and the persistent storage component of the node into a backup persistent storage.

14. The node management system of claim 12, wherein the backup persistent storage is one of a remote storage or other disk based storage.

15. The node management system of claim 12, wherein the first node is further configured to:

store an index of one or more keys processed by the node; and retrieve a backup of data stored in the shard based on the index.

16. The node management system of claim 9, wherein the first node is further configured to:

encrypt a value associated with the memory slot associated with the client request; and store the encrypted value in the memory slot.

17. A non-transitory computer-accessible medium having stored thereon computer-executable instructions, wherein upon execution by a computer arrangement comprising a processor, the instructions cause the computer arrangement to perform procedures, comprising:

dividing a node into a plurality of shards, each shard comprising a plurality of volatile memory slots and persistent storage slots;

identifying one of the plurality of shards, and an allocation of at least one of that shard's plurality of volatile memory slots and the plurality of persistent storage slots based on a client request;

locking the allocated at least one volatile memory slot;

performing one or more operations, based on the client request, on the allocated at least one volatile memory slot;

unlocking the allocated at least one volatile memory slot upon completion of performing the one or more operations, wherein the one or more volatile memory slots and the one or more persistent storage slots are locked when the one or more operations are performed; and updating the allocated at least one persistent storage slot based on the one or more operations performed on the at least one volatile memory slot.

18. The non-transitory computer-accessible medium of claim 17, further comprising retrieving shard rules of the identified shard.

19. The non-transitory computer-accessible medium of claim 18, further comprising updating a volatile memory slots associated with the at least one persistent storage slot based on the shard rules.

20. The non-transitory computer-accessible medium of claim 17, wherein the at least one of the plurality of volatile memory slots represent a portion of an in-memory least-recently used (LRU) component of the node, and the at least one of the plurality of persistent storage slots represent one or more column families of a persistent storage component of the node.

* * * * *